United States Patent
Clark, III

(10) Patent No.: US 7,498,748 B2
(45) Date of Patent: Mar. 3, 2009

(54) METHOD AND APPARATUS FOR PROVIDING POWER IN AN ELECTRICAL SYSTEM

(76) Inventor: Howard G. Clark, III, 2155 Pommel Ave., Las Vegas, NV (US) 89119

( * ) Notice: Subject to any disclaimer, the term of this patent is extended or adjusted under 35 U.S.C. 154(b) by 18 days.

(21) Appl. No.: 11/290,907

(22) Filed: Nov. 30, 2005

(65) Prior Publication Data

US 2007/0120422 A1    May 31, 2007

(51) Int. Cl.
    *H05B 41/16*    (2006.01)
(52) U.S. Cl. .................. 315/141; 315/224; 315/307; 363/154
(58) Field of Classification Search .......... 323/215–220, 323/340–344, 255–260, 902, 361, 272; 363/90, 363/37, 64, 71, 43, 40, 84, 34, 87, 77, 154, 363/90.37; 315/224, 307, 141, 146, 194, 315/276, 297; 336/148, 10, 12
See application file for complete search history.

(56) References Cited

U.S. PATENT DOCUMENTS

| | | | | |
|---|---|---|---|---|
| 4,023,090 | A | * | 5/1977 | Kljucaricek .................. 323/342 |
| 4,513,224 | A | * | 4/1985 | Thomas ...................... 315/141 |
| 5,006,783 | A | | 4/1991 | Corel |
| 5,093,614 | A | * | 3/1992 | Woodworth ................. 323/361 |
| 5,528,110 | A | | 6/1996 | Archdekin |
| 5,557,249 | A | | 9/1996 | Reynal |
| 5,867,358 | A | * | 2/1999 | Campbell .................... 361/47 |

\* cited by examiner

*Primary Examiner*—Rajnikant B Patel
(74) *Attorney, Agent, or Firm*—Greenberg Traurig

(57) ABSTRACT

A method and apparatus for providing power in an electrical system is disclosed. The electrical system comprises: a poly-phase electrical source; a plurality of transformers coupled to each other, where each phase of the poly-phase source is coupled to a transformer within the plurality. The electrical system further comprises a plurality of loads, where each load is coupled to a tap point on one of the transformers and where the transformers are capable of being severed at their common connections and coupled to a neutral line.

14 Claims, 4 Drawing Sheets

METHOD AND APPARATUS FOR PROVIDING POWER IN AN ELECTRICAL SYSTEM

BACKGROUND

Electricity is an indispensable resource in society. The generation of electricity may take many forms including coal, gas, oil, hydroelectric, and nuclear generation techniques. Since each of the techniques for generating electricity can have a detrimental impact on society, it is often desirable to minimize the amount of electricity or electrical power consumed by various electrical systems. While reducing power consumption is often a goal in designing electrical systems, system designers also must consider the impact that reducing the power consumption will have on the overall system functionality. For example, in the context of lighting systems, power consumption may be reduced by dimming the lights, yet such a practice may yield unacceptably low levels of light especially in incandescent lighting systems. However, certain lighting systems exist that can accommodate lower voltage levels without hindering operation—e.g., florescent lamps and high intensity discharge (HID) lamps.

In general, florescent lights operate by positioning electrodes at opposite ends of a gas tube filled with a relatively low pressure gas vapor, such as mercury or argon vapor. Electrons flow through the gas from one electrode to the other. As the electrons travel from one electrode to the other, the electrons interact with the vapor in the tube to excite the gas vapor. The gas vapor eventually returns to an unexcited state, and in so doing, releases photons that interact with a phosphor coating on the inside of the tube to produce light.

During florescent lamp operation, a high voltage surge is applied to the lamp to establish an arc in the gas vapor. Once the arc is established, the resistance of the gas vapor decreases, and therefore the current through the tube should be regulated to match the decreasing resistance. Such current regulation usually occurs by regulating the voltage across the lamp. Without regulation, the lamp would draw power unceasingly and would rapidly burn out. A ballast provides the starting voltage and may also regulate the subsequent reduction in voltage across the lamp.

The operation of HID lighting is similar to fluorescent lighting. Namely, an arc is established between two electrodes in a gas filled tube that causes a metallic vapor to produce radiant energy. One major difference between the two technologies is that HID lamps can produce visible light without phosphorus. In addition, the electrodes of an HID lamp are only a few inches apart and the gases in the tube are highly pressurized.

Akin to florescent technology, a ballast is required in order to operate the HID lamp and regulate the voltage provided to the lamp once an arc is established. Unlike fluorescent lamps, HID lamps require a warm-up period to achieve full light output, and in some cases the lamps require several minutes before they can be re-ignited after they are shut off. Accordingly, methods and apparatuses for regulating the amount of power consumed by lighting systems are desirable.

SUMMARY

A method and apparatus for providing power in an electrical system is disclosed. The electrical system comprises: a poly-phase electrical source; a plurality of transformers coupled to each other, where each phase of the poly-phase source is coupled to a transformer within the plurality. The electrical system further comprises a plurality of loads, where each load is coupled to a tap point on one of the transformers and where the transformers are capable of being severed at their common connections and coupled to a neutral line.

BRIEF DESCRIPTION OF THE DRAWINGS

A better understanding of the various embodiments of the present invention can be obtained when the following detailed description is considered in conjunction with the following drawings, in which.

DETAILED DESCRIPTION

Figure 1A:
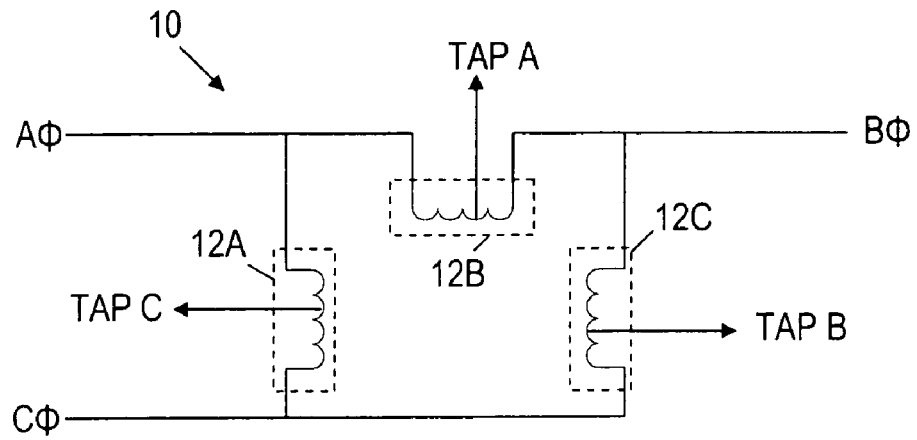
FIG. 1A illustrates an exemplary transformer arrangement.

FIG. 1A illustrates a system 10 for regulating voltage to electrical loads including lighting systems. System 10 includes transformers 12A-C connected serially in a "delta" connection, which is a connection used in three-phase electrical systems in which three elements in series form a triangle-like connection, with the power supply input at the three junctions.

Electrical power is coupled to system 10 at the common terminals shared by transformers 12A-C. The electrical power entering the system 10 is three-phase power which uses three voltages of the same frequency that are displaced in phase by 120°, represented by AΦ, BΦ, and CΦ. Exemplary voltage levels for the three phases include 120, 240, and 480 volts. Although system 10 refers to three-phase electrical systems, system 10 also may be implemented in poly-phase electrical systems including multiple electrical elements.

Each of the transformers 12A-C includes a tap; tap A, tap B and tap C. If each transformer in system 10 is balanced and the tap is placed in the same relative position on each transformer 12A-C, then the voltage at each tap will be equal. Also, with the taps configured in this manner, the relationship between the phases is preserved—i.e., in the three-phase system 10, the voltage at each tap is separated by 120°. Each transformer tap in system 10 may then be connected to an electrical load as illustrated in FIG. 1B.

Figure 1B:
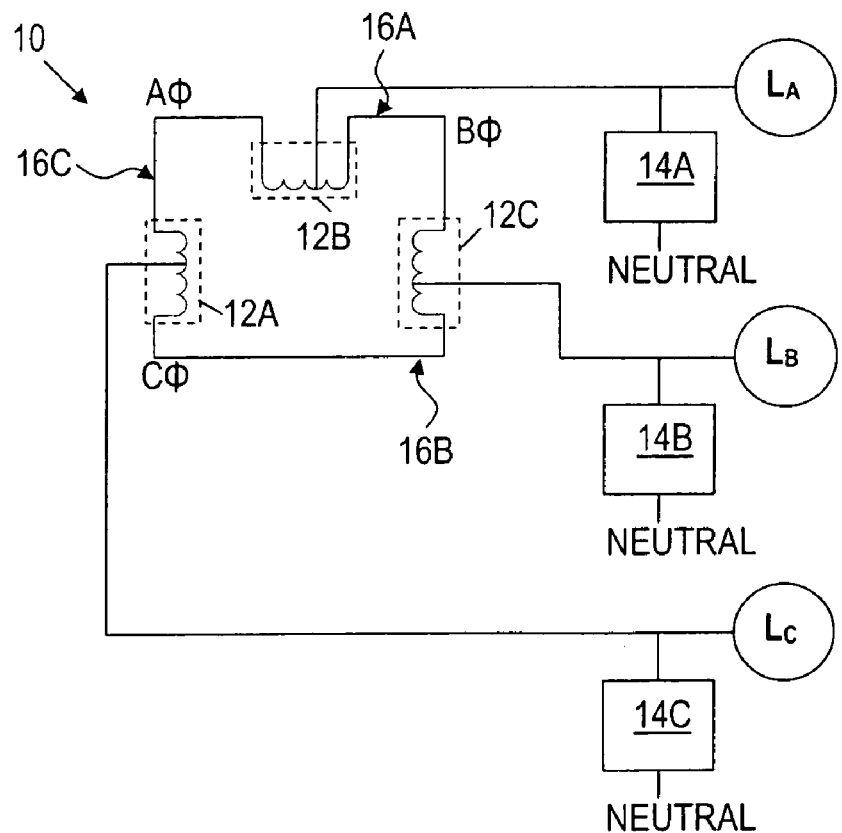
FIG. 1B illustrates coupling a load to the exemplary transformer arrangement.

As shown in FIG. 1B, loads LA, LB, and LC couple to the taps of transformers 12A-C respectively. Circuit elements 14A-C also may be coupled between the taps of transformers 12A-C and a neutral line, and may be used to balance the impedance present at the various taps. Circuit elements 14A-C may be implemented as any type of electrical element, such as a resistor, capacitor, or inductor. For example, if load LA is more inductive than loads LB and LC, then element 14A may be implemented as a capacitor to counter act the inductance. Similarly, if load LA is more capacitive than loads LB and LC, then element 14A may be implemented as an inductor to counter act the capacitance. With each tap balanced in this manner, each phase AΦ, BΦ, and CΦ may be provided to the loads LA, LB, and LC as if each phase were directly connected to each load. That is, each tap provides the full voltage from AΦ, BΦ, and CΦ, where this voltage is separated by 120°.

Figure 1C:
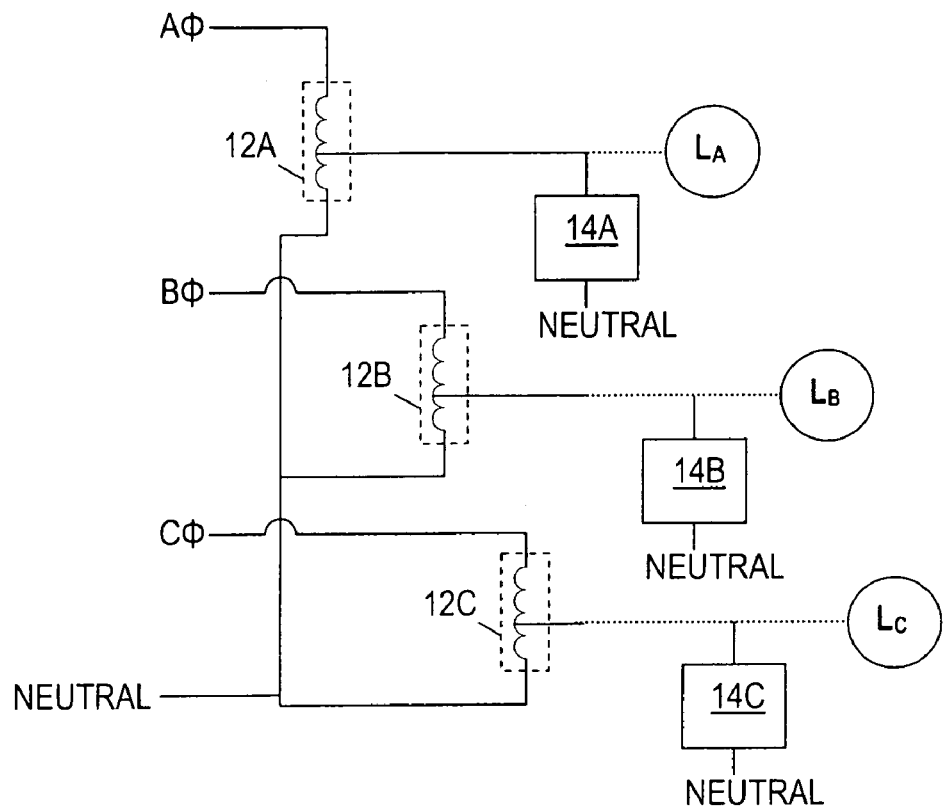
FIG. 1C illustrates an exemplary technique for providing a reduced voltage to the various loads.

As described above, loads LA, LB, and LC may include lighting systems that benefit from voltage regulation techniques. In accordance with the various embodiments, system 10 may be switched to a different voltage state by severing common nodes 16A-C shown in FIG. 1B. FIG. 1C depicts the result of severing these common nodes 16A-C and coupling them to the neutral line, which generally provides no voltage potential. By severing the common nodes and coupling them to the neutral line, the voltage provided to the loads LA, LB, and LC by each of the taps may be reduced or "stepped down" to a predetermined level. Although the taps step down the voltage from AΦ, BΦ, and CΦ to a lower level, the phase separation of 120° is preserved because the loads present at each tap are balanced. Thus, lighting systems (such as the aforementioned HID and florescent lighting systems) may be regulated by providing the tap voltage to the various lighting systems, where this tap voltage is regulated by severing connections at the common nodes 16A-C and coupling them to the neutral line.

Figure 2:
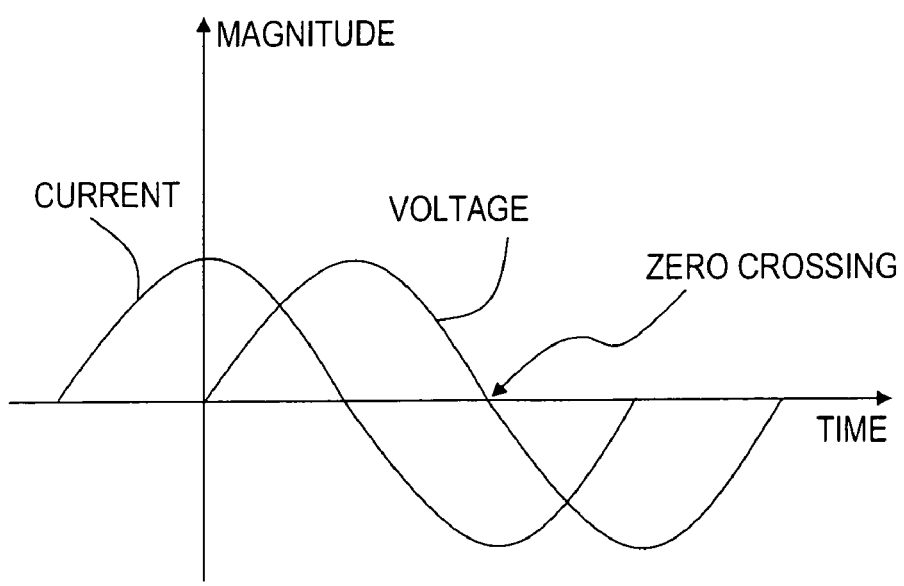
FIG. 2 illustrates exemplary waveforms in the system.

FIG. 2 illustrates the relationship between the voltage and current in one of the transformers 12A-C of system 10. The voltage and current flowing in system 10 are sinusoidal in nature. As illustrated, the ordinate axis denotes the magnitude of the current and voltage waveforms and the abscissa axis denotes time. By observing the voltage and current waveforms, a phase relationship between the waveforms may be determined. Depending on the circuit elements in system 10, a variety of phase relationships may occur between the current and the voltage. For example, the phase relationship depicted in FIG. 2 represents a "lagging" phase relationship where the current lags behind the voltage by ¼ of a cycle or 90°. This lag relationship is often the case when inductive circuit elements (such as transformers 12A-C) are used.

The voltage and current waveforms shown in FIG. 2 cross the abscissa axis resulting in what are termed "zero crossings" since the value of the waveform's magnitude is substantially equal to zero at these points. In accordance with some of the embodiments, switching to a different voltage state by severing the common nodes 16A-C and coupling them to a neutral line occurs during the zero crossings of the voltage waveform. Switching between the voltage states at the zero crossings in this manner has numerous advantages including, reducing harmonics signals in the system, reducing unwanted arcing and providing for longer life for bulbs in lighting systems.

Figure 3:
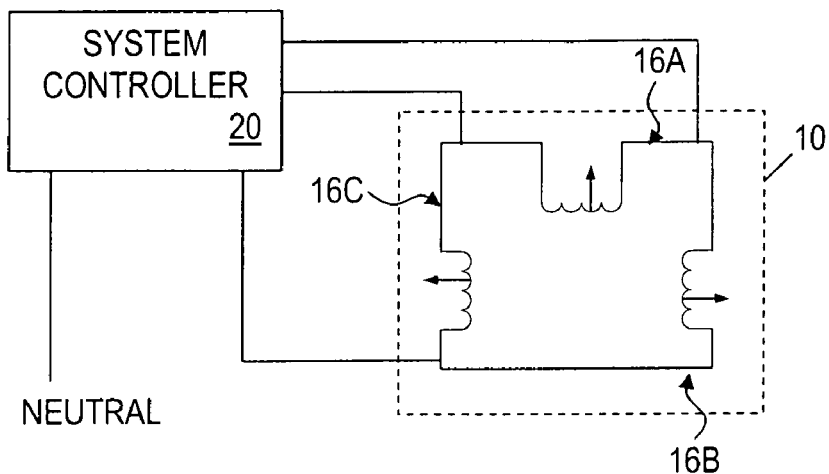
FIG. 3 illustrates an exemplary controller.

FIG. 3 depicts the delta connected transformers of system 10 coupled to a system controller 20 at common nodes 16A-C. System controller 20 is also coupled to the neutral line. Load connections are not shown in FIG. 3 for the sake of clarity. System controller 20 is capable of monitoring the current and voltage through each of the transformers in system 10, severing the common nodes 16A-C and coupling them to the neutral line as disclosed above.

Figure 4B:
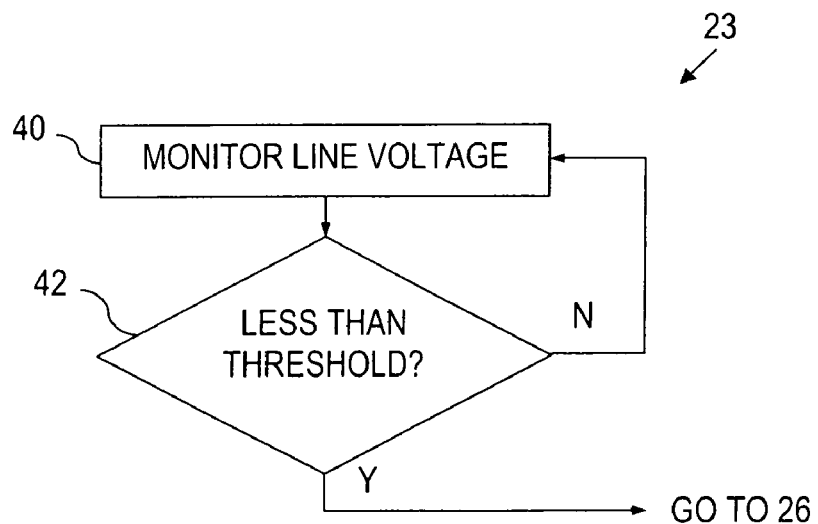
FIG. 4B illustrates an exemplary algorithm for monitoring the voltage to the loads.
Figure 4A:
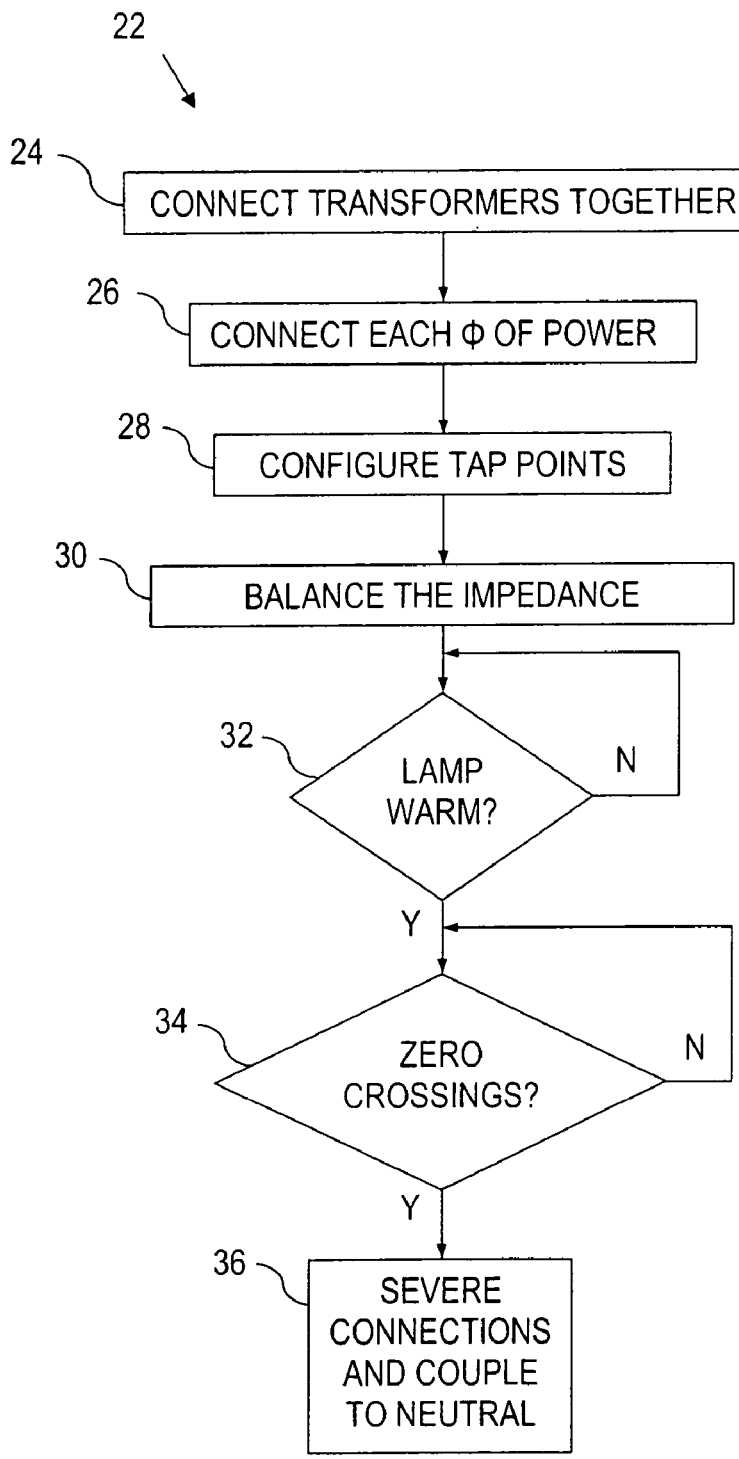
FIG. 4A illustrates an exemplary algorithm for providing voltage to the loads.

FIGS. 4A and 4B illustrate exemplary algorithms 22 and 23 respectively that controller 20 may implement in controlling various lighting systems. Referring to algorithm 22 in FIG. 4A, transformers are connected together in block 24. The number of transformers connected together in block 24 depends on the number of phases of power provided. In block 26, each phase of the full line voltage is coupled to the common connections between the various transformers in the system. Next, each transformer's tap point is configured to provide the desired voltage in block 28. For example, the tap points on the various transformers may be configured to divide down the voltage from the full line voltage to a reduced value such as 70% of the full line voltage.

With each of the tap points configured, the impedance presented to each tap point is balanced as indicated in block 30. This may include attaching resistive, capacitive, and inductive circuit elements to each tap point as discussed above with regard to circuit elements 14A-C. Balancing the impedance in this manner ensures that each tap point is presented with the same impedance and therefore ensures that the loads receive voltages that are the full line voltage and that have no phase offset.

As illustrated in block 32, the load or lamp is then checked to determine whether it has achieved its "warm" state so that its voltage may be reduced for power savings. For example, in the case of florescent or HID lamps, the warm state is denoted by establishing an arc in the gas vapor, which subsequently reduces the resistance of the gas vapor and increases power consumption. Determining whether the lamp has achieved this warm state may be accomplished by measuring either the resistance of the gas vapor, or by measuring an elapsed time and comparing the elapsed time to a known value. For instance, HID lamps may take 15 minutes to warm up, whereas florescent lamps may take 3 minutes to warm up. Thus, if the lamp is not warm, then the lamp is monitored until it becomes warm per block 32. If the lamp is warm, then the voltage to the lamp is ready to be regulated by switching to a lower value.

As indicated in block 34, algorithm 22 may wait for the next zero crossing before switching to a lower voltage value. This may occur by monitoring the voltage through a transformer in the system. If the magnitude of the voltage in the transformer is not equal to zero, then algorithm 22 continues to monitor the voltage in the transformer until this condition is met. Once the magnitude of the voltage in the transformer is equal to zero, the common connections between transformers are severed and coupled to neutral per block 36, which effectively provides a lower voltage to the various loads in the system where the phase of the voltages remains unchanged.

With the loads in their low power state according to algorithm 22, algorithm 23 may be implemented to ensure that the loads continue to receive an adequate amount of power. For example, during periods of peak electrical demand, the line voltage may be reduced, resulting in a condition called a "brown out." Accordingly, the line voltage may be monitored to determine voltage reductions per block 40. The value of the line voltage is compared to a predetermined threshold to determine if the reduced voltage is going to be a problem for the lamps, which are already receiving a reduced voltage. If the line voltage is not less than the predetermined threshold, then the line is monitored according to block 40. However, if the line voltage is less than the predetermined threshold, then the lamps may be switched back to receive the full line voltage by looping back to block 26 of algorithm 22.

Although not shown in FIG. 4B, instead of directly looping back to block 26, algorithm 23 may attempt to dynamically adjust the tap points and then determine if the tap voltage provided to the lamps is less than a predetermined threshold. If adjusting the tap points yields the desired voltage level, then looping back to block 26 in the event of a brown out may be avoided.

While embodiments of the present invention have been shown and described, modifications thereof can be made by one skilled in the art without departing from the spirit and teachings of the invention. For example, although the above disclosure deals with HID and florescent lamps, other lamps and loads are possible. The embodiments described herein are exemplary only, and are not intended to be limiting. Accordingly, the scope of protection is not limited by the description set out above. Each and every claim is incorporated into the specification as an embodiment of the present invention.

I claim:

1. An electrical system, comprising:
    a poly-phase electrical source;
    a plurality of transformers coupled to each other, wherein each phase of the poly-phase source is coupled to a transformer within the plurality;
    a plurality of loads, wherein each load is coupled to a tap point on one of the transformers;
    wherein the transformers are capable of being severed at their common connections and coupled to a neutral line; and
    a controller coupled to the transformers and the neutral line and adapted to monitor the current through and voltage across each of said plurality of transformers, wherein the controller is configured, responsive to load feedback, to sever the transformers and couple them to the neutral line during zero crossings of a voltage of at least one of the transformers.

2. The electrical system of claim 1, further comprising a plurality of circuit elements coupled to the tap points, wherein the circuit elements balance the impedance on each tap point.

3. The electrical system of claim 1, wherein the loads comprise lamps and the controller monitors the lamps.

4. The electrical system of claim 3, wherein the controller severs the transformers and couples them to the neutral line if a gas vapor in the lamp decreases in resistance.

5. The electrical system of claim 3, wherein the controller severs the transformers and couples them to the neutral line if a predetermined amount of time has elapsed.

6. The electrical system of claim 5, wherein the controller reconnects the transformers and decouples them from the neutral line if the magnitude of the voltage of the poly-phase source is below a predetermined threshold.

7. The electrical system of claim 1, wherein the transformers are coupled together serially.

8. A method of providing power in an electrical system, comprising:
    connecting a plurality of transformers together;
    coupling at least one phase of power from a poly-phase electrical source to each transformer;
    providing power to a lamp from a tap point on each transformer;
    determining if the lamp has reached a warm up state including measuring a resistance of the lamp;
    determining a zero crossing of a voltage in a transformer within the plurality of transformers;
    severing the transformer connections during the zero crossing; and
    coupling the transformers to a neutral line.

9. The method of providing power of claim 8, wherein determining if the lamp has reached a warm up state includes measuring an elapsed time and comparing the elapsed time to a predetermined value.

10. The method of providing power of claim 8, further comprising balancing the impedance present on each tap point.

11. The method of providing power of claim 8, wherein the plurality of transformers are coupled together in a delta connection.

12. The method of providing power of claim 8, further comprising monitoring the voltage of the poly-phase electrical source after the transformer connections have been severed.

13. The method of providing power of claim 12, further comprising reconnecting the plurality of transformers together if the voltage of the poly-phase electrical source is less than a predetermined threshold.

14. An electrical system, comprising:
    a poly-phase electrical source;
    a group of serially connected transformers coupled to the poly-phase source;
    means for providing a voltage from the group of transformers to a lamp;
    means for determining whether the lamp has reached a warm up state;
    means for determining a zero crossing of the voltage provided to the lamp;
    means for disconnecting the group of transformers and reducing the voltage provided to the lamp responsive to the lamp reaching the warm up state determining a zero crossing of the voltage provided to the lamp; and
    means for reconnecting the transformers and increasing the voltage provided to the lamp if the voltage on the poly-phase electrical source fluctuates.

* * * * *